(12) United States Patent
Baranowski et al.

(10) Patent No.: US 10,033,719 B1
(45) Date of Patent: Jul. 24, 2018

(54) MOBILE WORK PLATFORM FOR REMOTE DATA CENTERS

(71) Applicant: Amazon Technologies, Inc., Reno, NV (US)

(72) Inventors: Matthew Paul Baranowski, Seattle, WA (US); Srinivas Guduru, Redmond, WA (US); Patrick James Ward, Snoqualmie, WA (US)

(73) Assignee: Amazon Technologies, Inc., Seattle, WA (US)

( * ) Notice: Subject to any disclaimer, the term of this patent is extended or adjusted under 35 U.S.C. 154(b) by 77 days.

(21) Appl. No.: 13/721,998

(22) Filed: Dec. 20, 2012

(51) Int. Cl.
*H04L 9/32* (2006.01)
*H04L 29/06* (2006.01)

(52) U.S. Cl.
CPC ............ *H04L 63/0823* (2013.01); *H04L 9/32* (2013.01); *H04L 9/3263* (2013.01); *H04L 63/0876* (2013.01)

(58) Field of Classification Search
CPC  H04L 63/0823; H04L 63/0884; H04L 63/101
USPC ............................................. 726/5–7, 10, 12
See application file for complete search history.

(56) References Cited

U.S. PATENT DOCUMENTS

| | | | | |
|---|---|---|---|---|
| 6,823,454 | B1 * | 11/2004 | Hind ................. | H04L 29/12066 713/168 |
| 7,117,363 | B2 * | 10/2006 | Lincoln ............... | G06Q 20/108 713/175 |
| 7,735,126 | B2 * | 6/2010 | Zhang ................ | G06Q 20/3674 380/255 |
| 9,009,463 | B2 * | 4/2015 | Yin ..................... | H04L 63/0823 713/156 |
| 2007/0179901 | A1 * | 8/2007 | Kresina ........................... | 705/60 |
| 2009/0222657 | A1 * | 9/2009 | Bender ................. | H04L 9/3265 713/156 |
| 2009/0282192 | A1 * | 11/2009 | Maus et al. .................... | 711/115 |
| 2010/0017859 | A1 * | 1/2010 | Kelly et al. ....................... | 726/5 |
| 2011/0199955 | A1 * | 8/2011 | Seite ....................... | H04L 12/18 370/312 |
| 2011/0247055 | A1 * | 10/2011 | Guo et al. .......................... | 726/4 |
| 2013/0225128 | A1 * | 8/2013 | Gomar ........................ | 455/411 |
| 2014/0013109 | A1 * | 1/2014 | Yin ............................... | 713/156 |

* cited by examiner

*Primary Examiner* — Linglan E Edwards
(74) *Attorney, Agent, or Firm* — Baker & Hostetler LLP (57) ABSTRACT

Access to an information technology resource may be provided to a user involved in a data center construction project. The information technology resource may be located on a secure network, but be made accessible to the user through one or more unsecure networks. Access to the information technology resource aids the user in performing tasks related to data center construction, such as tracking the receipt and installation of equipment.

6 Claims, 7 Drawing Sheets

MOBILE WORK PLATFORM FOR REMOTE DATA CENTERS

BACKGROUND

The construction of a new data center is a complex project involving the delivery, installation, and configuration of hundreds or thousands of pieces of complex technical equipment. Data center construction also requires coordinating the efforts of numerous employees and contractors. To complete the project successfully, a company's employees and contractors require access to various information technology resources such as databases, file servers, project management systems, and so forth. For a number of reasons, these resources are typically accessible only through the company's existing secure networks. Personnel at the construction site therefore need some way to access resources on the secure network.

However, the nature of data center construction projects introduces a number of obstacles to achieving secure and cost-effective connectivity between the devices used by personnel at the construction site and the company's existing networks. Data centers may be situated at remote locations with poor existing communications infrastructure. The available communications infrastructure may also evolve over the course of the project. Communication with the company's existing network should, therefore, be relatively unaffected by the underlying infrastructure. There are also important security considerations. Untested equipment may contain viruses or other threats, and should be scanned before being connected to a network. In addition, access to the company's existing network should be limited to those resources needed for the construction project, a task complicated by the large number of temporary personnel often involved in such projects. In addition, the personnel involved in the project are often highly mobile, moving frequently throughout the data center or between projects.

BRIEF DESCRIPTION OF THE DRAWINGS

The drawings are provided to illustrate example embodiments described herein and are not intended to limit the scope of the disclosure.

DETAILED DESCRIPTION

Various aspects of the disclosure are described herein with regard to certain examples and embodiments, which are intended to illustrate but not to limit the disclosure. It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures and other types of structures that perform particular tasks or implement particular abstract data types.

Those skilled in the art will also appreciate that the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, cellular telephone devices, special-purposed hardware devices, network appliances and the like. The embodiments described herein may also be practiced in distributed computing environments, where tasks are performed by remote processing devices that are linked through a communications network. In a distributed computing environment, program modules may be located in both local and remote memory storage devices.

Within the specification, references are made to the accompanying drawings that form a part hereof, and that show, by way of illustration, specific embodiments or examples. The drawings herein are not drawn to scale. Like numerals represent like elements throughout the figures.

The construction of a data center is a highly complex endeavor involving numerous technological and logistical challenges. A large data center may employ thousands of components such as servers, routers, power supplies, and cooling systems. Management of the construction project involves tracking the ordering, shipment, placement, and configuration of each component, as well as coordinating the efforts of numerous employees and contractors.

Further complicating matters, the data center under construction may be located at a remote site. The nascent data center may be located at a site that is remote to the owning company, but still close to technological infrastructure such as fiber optic lines. In other, more complex cases, the location may be so remote that even basic telecommunication services are unavailable, at least initially. Under either of these scenarios, access to the company's existing information technology resources is obstructed, making tracking and coordination efforts even more challenging. Data center construction projects would therefore benefit from techniques for quickly establishing communications with the company's existing information technology resources.

Another factor is the mobility of personnel involved in the construction project. The workers involved in the project tend to be highly mobile, moving both throughout the construction site and between various construction projects. To perform efficiently, these workers require convenient access to the company's information technology resources, in order to perform construction-related tasks such as component tracking and project management.

Security is also an important factor in constructing data centers. Broadly speaking, the security problems may be classified into at least two general categories. The first is the security of the company's existing information technology resources. These resources are presumed to be hosted on the company's internal network, or in other words a network exclusive of those being constructed in the nascent data center. The company's internal network will typically include various resources useful for tracking and coordinating the data center construction project.

The second category involves the data center under construction. Without appropriate measures, the security of the nascent data center can be compromised by threats such as viruses, unauthorized network surveillance devices, and so forth. Control and inspection of received hardware is a useful countermeasure to such threats, but typically requires access to information technology resources such as ordering and shipping information to ensure that the hardware was shipped from a trusted source, or antivirus programs for scanning the contents of received hard drives. Furthermore, failure to enact these countermeasures from the start of the project creates an undesirable window of vulnerability. One solution to this issue is to host the necessary information technology resources on the company's internal network, provided that an efficient and cost-effective means of access can be provided.

As an additional measure of security during data center construction, it may be desirable to restrict access to information technology resources based on various criteria such as the means of access being employed, the user attempting to access the information, the location of the user at the time of access, and so forth. For example, access to shipping information might be made available to anyone who works for the new data center's mailroom, but only while using a specific device assigned to each employee. One benefit of this approach is that it discourages employees from sharing devices or credentials, because the credentials must be matched to the device.

It would be beneficial to have a mobile work platform usable to perform various tasks related to data center construction, including tasks that require access to the information technology resources located on the company's existing internal networks. Accordingly, the work platform should have a way of connecting to a secure network and accessing the necessary information technology resources, even when the connection is made through one or more unsecure networks. More generally, it would be desirable to provide techniques for securely accessing information technology resources on a secure network, even when communications pass over one or more unsecure networks such as cellular telephone networks and the Internet. There are, however, a number of obstacles to achieving useful access to information technology resources from within the nascent data center, some of which are described herein.

First, data centers are often located in remote locations that, at least initially, offer no convenient means of direct access to the company's internal network, or even to an external network such as the Internet. When connectivity is available, it may be unreliable, intermittent, or expensive. The means used for communications may also vary. For example, in various examples some combination of cellular, landline, WiFi, or microwave-based communications might be employed. The technology employed may further vary over time and between various data center construction projects. Accordingly, the work platform should operate, to the extent possible, independently of the underlying communications technology.

Second, directly connecting to the internal network is undesirable because of security concerns. New and untested equipment may, for example, contain viruses that could compromise the internal network. On the other hand, the necessary resources to detect and correct such problems, such as up-to-date virus definitions, may exist only on the internal network. It is therefore beneficial to provide an indirect means of connecting to the internal network that allow access only for a limited set of purposes, such as obtaining up-to-date virus definitions.

Third, conventional means of providing network security may be inadequate. For example, firewalls may be employed to separate trusted and untrusted networks. However, firewalls generally operate on the packet level and do not provide for the various security features described above. Furthermore, different firewalls or firewall rule-sets might be required for each data center under construction, or the rule sets might need to be updated as the construction projects progress through various stages. Such an approach is labor intensive and error prone, and therefore likely to compromise security.

In addition, access from the data center construction site to information technology resources on the secure network should be both independent of the underlying communications medium and relatively low in cost. The communications medium may vary both between construction projects and within the same project as it progresses. For example, a cellular-telephone network might be used initially until a T1 line is installed. Accordingly, access to information technology resources on the secure network should be relatively unaffected by changes to the underlying communications medium.

Figure 1:
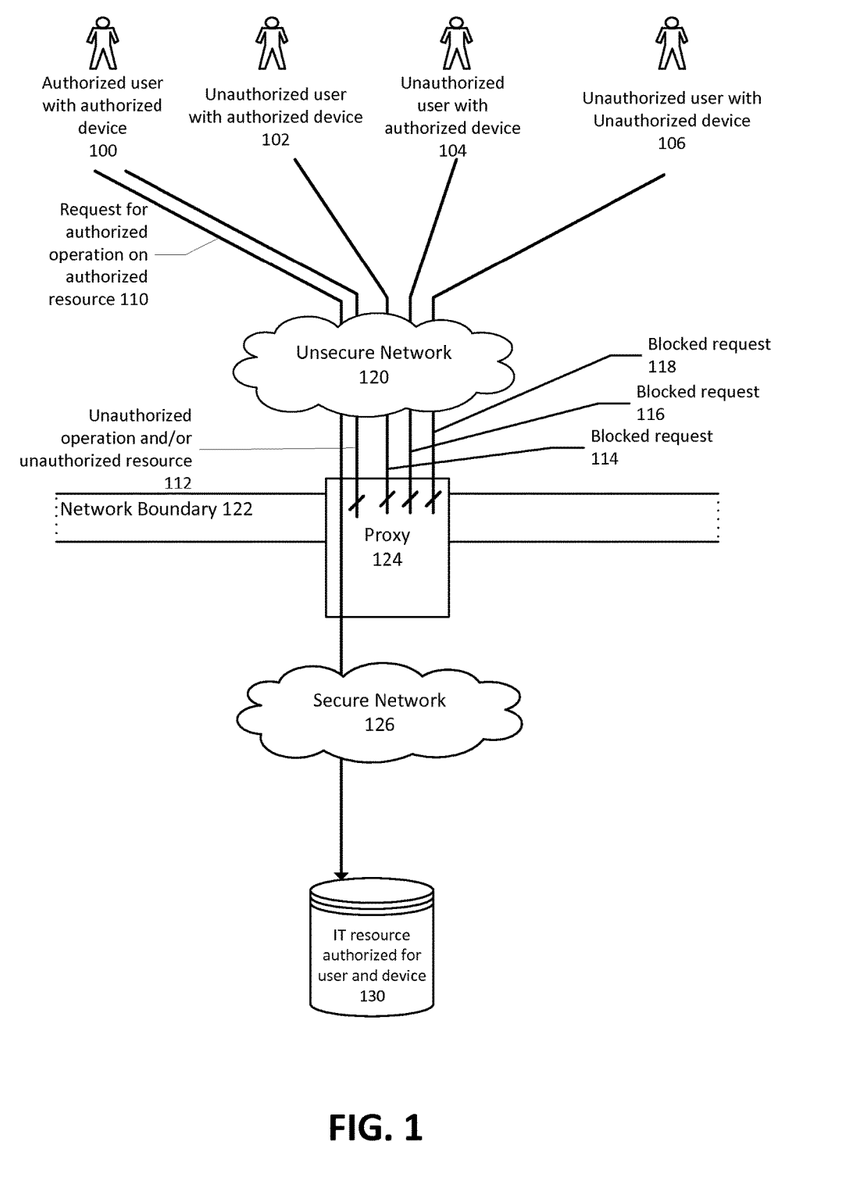
FIG. 1 depicts an embodiment of a communication system implemented consistent with aspects of the present disclosure.

FIG. 1 depicts an embodiment of a communication system implementation consistent with aspects of the present disclosure. Various users and devices 100, 102, 104, and 106 communicate via an unsecure network 120 to a proxy 124. In some embodiments, proxy 124 straddles network boundary 122, for example by being connected simultaneously to unsecure network 120 and secure network 126. The proxy may, for example, be a computing device having two network cards, one connected to an unsecure network and another to a secure network. Those of ordinary skill in the art will recognize that numerous means may be employed to connect to both the secure and unsecure networks. The connection between the unsecure network and the proxy does not need to be continuous or simultaneous with the proxy's connection to the secure network. In addition, the specific device or devices acting as the proxy do not necessarily have to straddle the network boundary.

Proxy 124 communicates via secure network 126 to information technology resource 130. Information technology resources may be of numerous types. Various non-limiting examples include databases, web services, workflow management, project management, product requisition, and so forth. Some information technology resources may be entirely automated, while others may require human intervention, of which purchase order approval might be one example.

An authorized user with an authorized device 100 may be granted access to information technology resource 130. With respect to the authorized user and device, the proxy will permit a request to perform an authorized operation on an authorized resource 130. However, the proxy may refuse a request for an unauthorized operation or resource, even if made by an authorized user with an authorized device 100. The proxy may base this refusal on a variety of reasons, such as the specific requested operation or resource not being authorized for the user. The proxy may also refuse access for an unauthorized user with an authorized device 102, an unauthorized user with an authorized device 104, and an unauthorized user with an unauthorized device 106.

In various embodiments, a work platform may comprise a mobile cellular device utilizing a public cellular telephone network and the Internet as underlying communications mediums. Various protocols or systems may be used to ensure that data sent over the cellular network and Internet is encrypted and secure from vulnerabilities such as replay attacks. Various non-limiting examples include secure sockets layer ("SSL"), internet protocol security ("IPSec"), or a virtual private network ("VPN"). If the latter is employed, it may be desirable to use a VPN implementation specifically adapted to mobile use.

As a generalization of the above, both the cellular telephone network and the Internet are examples of what can be categorized as unsecure communications networks. This category may also include networks installed in the nascent data center; these may be considered unsecure for various reasons, such as containing devices that have not yet been scanned for viruses, domain security has not yet been established, and so forth.

Figure 2:
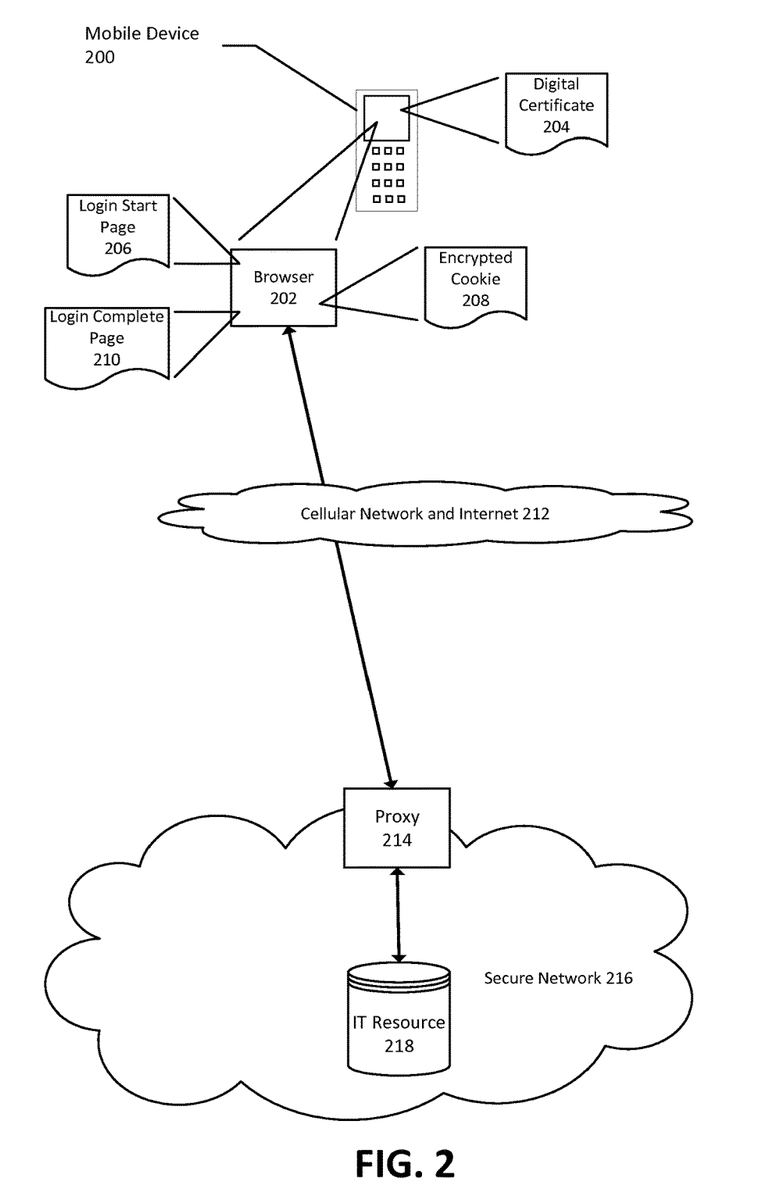
FIG. 2 depicts an embodiment employing a cellular device as a work platform for accessing information technology resources on a secure network, using a cellular network and the Internet as a communications medium.

FIG. 2 depicts an embodiment of a work platform and communications method employing a mobile device 200 configured to run browser 202 and having an installed digital certificate 204. The digital certificate may be downloaded and installed while the mobile device 200 is directly connected to a secure network 216, for example via WiFi prior to taking the device from company headquarters to the construction project work site. FIG. 2 depicts mobile device 200 communicating over cellular network and Internet 212, as the embodiment might be configured for use at the work site.

Browser 202 may be configured to process hypertext transfer protocol ("HTTP") web pages, potentially employing client-side script code, embedded controls, and so forth. The browser may process login start page 206 to begin a login process by sending digital certificate 204 to proxy 214.

Upon validation of digital certificate 204, Proxy 214 may return login complete page 210 to browser 202 on mobile device 200 for processing. During processing of login complete page 210, user credentials may be collected and sent to proxy 214. Upon authorization of the credentials, proxy 214 returns encrypted cookie 208. Subsequent requests for access to information technology resource 218 may be sent by mobile device 200 to proxy 214 accompanied by encrypted cookie 208. Proxy 214 causes information technology resource 218 to perform the requested access, and causes the results of the access to be returned to mobile device 200.

Digital certificates may be used to identify a device, such as the mobile device 200 depicted in FIG. 2. In various embodiments, a digital certificate is created with identifying information pertaining to the device. In others, the certificate may contain information identifying multiple devices. Additional information may also be encoded into the certificate, including but not limited to expiration date, issue date, user information, and so forth. Those with ordinary skill in the art will appreciate that once created, the information encoded in the certificate cannot be altered.

Once the certificate has been created, it may be downloaded and installed on the device that it identifies. This may be done while the device is directly connected to the secure network. A record of the certificate and the corresponding device identification information may be kept available on a database or other resource available on the secure network. It may also be desirable to store a record of users corresponding to a certificate, and of users corresponding to a device.

Figure 7:
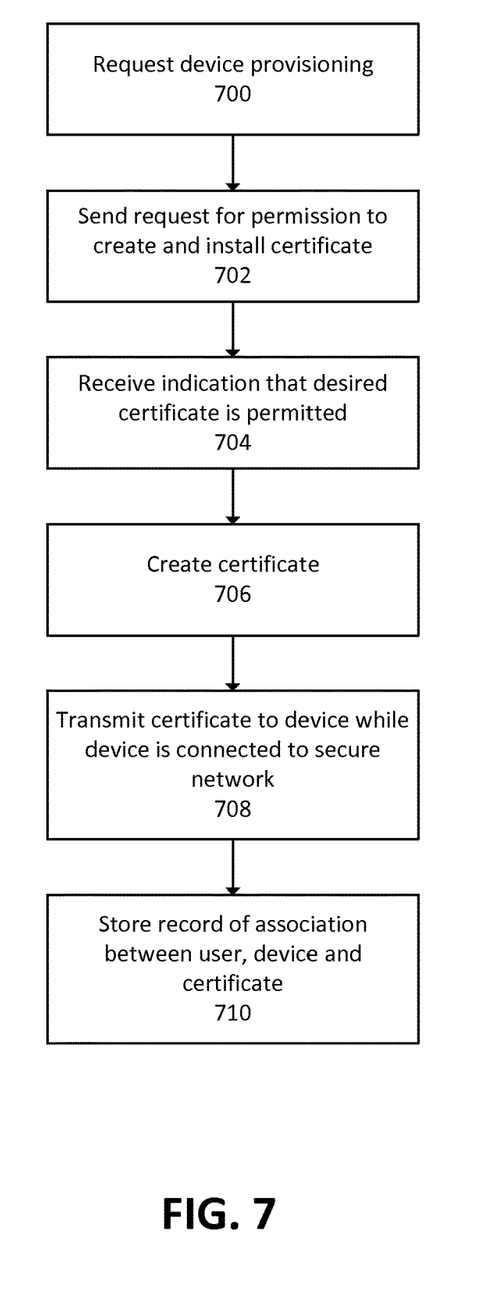
FIG. 7 depicts an embodiment of a process for creating a digital certificate and sending it to a device for installation.

FIG. 7 depicts creating a digital certificate and sending it to a device for installation. Although depicted as a sequence of operations, those of ordinary skill in the art will appreciate that the depicted operations may be reordered, altered, omitted, or performed contemporaneously.

A request for device provisioning is made at operation 700. In some embodiments, the request may be issued only from a device connected to the secure network. Device provisioning involves the creation and installation of a digital certificate that may be used in a manner consistent with aspects of the present disclosure, and in particular for validation and authentication during the login process described herein. The provisioning process generally results in the creation and installation of a certificate on a device, where the certificate contains information serving to associate the certificate with the device it is installed on, and may also contain other information such as the user to whom the device and certificate was issued.

At 702, a request may be sent, or otherwise initiated, for determining whether the creation and installation of the digital certificate is permitted. Likewise, at 704 an indication of that permission is received. The permission may be based on any number of factors, including but not limited to organizational issues, security concerns, and technological reasons. In some cases permission may be given automatically, or may require manual intervention such as the approval by the user's supervisor. In some embodiments, it may be desirable to integrate the approval granting process into workflow, project management, directory services, or enterprise resource planning systems.

At 706, the certificate is created, and possibly stored for subsequent sending or retrieval. At 708 the certificate is transmitted to the authorized device. In various embodiments, the certificate may be transmitted to the device only while the device is in direct communication with the secure network, with no intervening unsecure networks. The device may, for example, communicate directly with the secure network via a wireless access point for the secure network. When the device is connected in this fashion, the device user may initiate transmission of the certificate. This may be done, in various non-limiting examples, by executing an application on the device, navigating to a web page hosted by a server on the secure network, and so forth. Following transmission, the certificate is installed onto the device for use in a manner consistent with aspects of the present disclosure.

A record of the association between two or more of the user, device, and certificate may be stored in a database or other resource connected to the secure network, as depicted by operation 710. This information may be used for a variety of purposes as described herein.

A login process may be initiated by sending a request from the device. In a typical use case, this is done once the device has been removed to a remote location and it is no longer possible, or it is no longer appropriate, for the device to have direct access to the secure network. The login process may be summarized as one or more requests that supply the certificate and user credentials to a proxy. In an embodiment, the proxy validates this information and sends a symmetrically-encrypted cookie to the client. The cookie provides a means by which subsequent requests from the device can be validated and authorized.

In various embodiments, a request for initiating a login process may be sent from a device over one or more unsecure networks to a proxy. The request may comprise the previously-installed digital certificate, and may also include information identifying the sending device, in addition to the information encoded into the certificate. Cellular phones, for example, have a factory-set electronic serial number that identifies the device being used. In some embodiments, user credentials may be sent with the initial request, while in other embodiments a separate login page may be used.

The proxy may perform various operations to validate the request. For example, the validity of the certificate may be checked by a certificate authority, which may be located on the secured network or elsewhere, such as the Internet. Alternatively, cryptographic algorithms may be applied directly to the certificate. Optionally, something other than conventional digital certificates could be used, such as digital signatures or symmetric encryption.

In some embodiments, the certificate itself may have encoded information that may be used to further validate the request by verifying the relationship between the certificate, the requesting device, and the user. In other embodiments, an identifier such as the certificate serial number may be used for the same purpose. For example, a database available through the secured network could map the certificate serial number to the electronic serial number of a cellular telephone, and to the user who was issued the device. The proxy can then ensure that the electronic serial number associated with the certificate matches the electronic serial number of the device used to send the request.

The login process may employ user credentials to verify the identity of the device's user. The credentials themselves may take various forms, such as user name, password, values generated by hardware or software-based security tokens and so forth. The device receives and processes the login mechanism and submits the collected credentials to the proxy. Subsequently, the proxy may cause the set of credentials to be validated.

Code operating on the device will collect and send the credentials to the proxy. In some embodiments, this code may be provided by the proxy during the login process, rather than preinstalled on the device. In various non-limiting examples, the code could comprise a hypertext markup language ("HTML") page, script code, intermediate-language code, compiled executable code and so forth. It may be desirable for the code to be signed, to reduce the possibility of tampering.

Transport-level security mechanisms may be employed for communication between the device and proxy to reduce the vulnerability of the system to spoofing and other types of attacks. For example, secure-sockets layer ("SSL") may be employed for the duration of the login process. Various alternative means might be employed instead of or in addition to a transport-level security mechanism.

The proxy may verify the credentials by various methods, including the use of operating system interfaces that allow domain user credentials to be verified. Use of this approach allows integration with the secure network's domain security mechanism. However, those of ordinary skill in the art will appreciate that there are numerous other possible approaches to verifying credentials that might be employed.

As an additional security measure, correlations between the credentials, certificate, and device may be verified. During the login process, both a certificate and a set of credentials are received from a device. If an authorized user is attempting to logon from an authorized device, proper correlation may be established between some or all of these elements. For example, the received certificate's serial number may be used to retrieve a record pertaining to the certificate and indicating the user to whom it was issued. If this record is inconsistent with the received set of user credentials, the login process may be terminated. Similarly, the serial number of the requesting device may be compared to the serial number of the device to which the certificate was downloaded.

The login process may be completed by sending an encrypted cookie to the client. Information of various types may be embedded within the encrypted cookie, such as the login-name portion of the user credentials, the certificate's serial number, the device's serial number, an expiration date and so forth. It may also be advantageous to include identifiers for the certificate and device that cannot be determined by inspection of the certificate or the device. This could be an arbitrary value, such as a globally unique identifier, generated at the time the certificate was created.

For brevity, the term encrypted cookie is used throughout the disclosure to refer to any type of cookie where at least some of the cookie's payload or content portion is encrypted. In some embodiments it may be preferable to use an HTTP cookie with an encrypted payload, though any number of alternative formats might be employed. Regarding the type of encryption, any cryptographic technique may be used. The use of encryption prevents alteration of the payload and prevents inspection of its contents. In some embodiments, symmetric encryption may be used. In such cases, the proxy stores or has access to the encryption key used to encrypt and decrypt the encrypted payload. The use of symmetric encryption prevents the cookie's payload from either being altered or inspected without the key used for encryption. These qualities are desirable because the payload contains information used for validation, such as the certificate serial number.

The cookie is stored on the client device after being received, for at least as long as its expiration date. This may be facilitated by providing an expiration date value that can be read by the client, separate from the expiration date value in the encrypted payload portion of the cookie. When communication between the client and proxy is done via HTTP, the standard HTTP cookie expiration mechanism might be employed.

Figure 3:
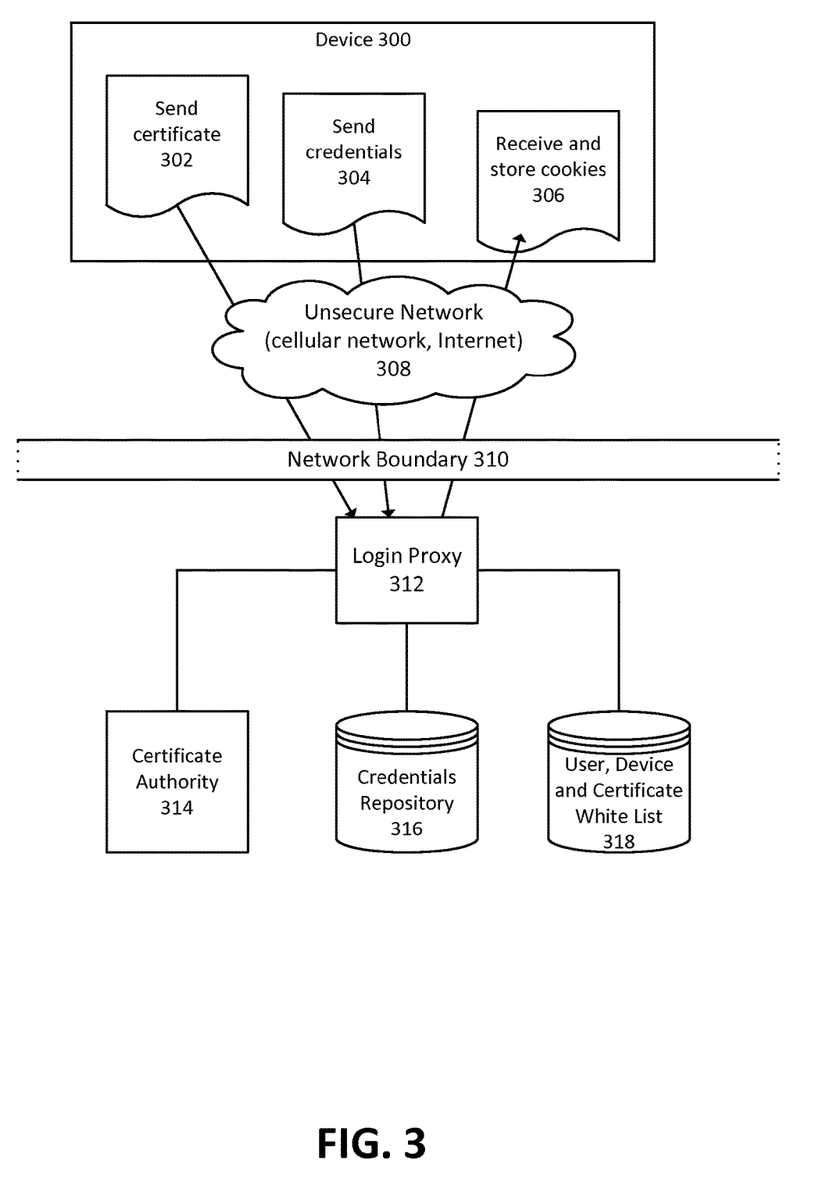
FIG. 3 depicts an embodiment of a system for a user and device login consistent with aspects of the present disclosure.

FIG. 3 depicts an embodiment of a login process consistent with aspects of the present disclosure. In general terms, the depicted login process comprises a mechanism for validating and authorizing requests for access to information technology resources on a secure network.

FIG. 3 depicts operations for sending a certificate 302, sending credentials 304, and receiving and storing cookies 306, performed by device 300 communicating over an unsecure network 308 to a login proxy 312. Unsecure network 308 may comprise one or more network types, such as a cellular telephone network connected to the Internet. In some embodiments, the unsecure network may comprise the network of the data center under construction.

The login proxy 312 is situated behind or straddling the network boundary 310 between secure and unsecure networks. Although the login proxy is depicted in FIG. 3 as a distinct entity, it may be combined with various other processes, modules, applications, and so forth. In particular, the functions of the login proxy 312 may be integrated with the application programming interface ("API") proxy 408 depicted in FIG. 4. In this context, the term API may refer to any means of accessing, modifying or otherwise interacting with the information technology resource.

Login proxy 312 receives the certificate sent in operation 302. The certificate may then be validated by certificate authority 314, which may take various forms such as a separate process, API call or other means. Receipt of a valid certificate from device 300 suggests to the login proxy 312 that the device has been authorized. The login proxy 312 may take further steps to validate the certificate and its correlation to the device. For example, a device identifier of some kind may be sent in addition to the certificate, which may have the same device identifier encoded within it. In various non-limiting examples, the device identifier may be an electronic serial number such as those associated with cellular telephones, a CPU serial number, a product licensing key, a globally unique identifier, an assigned number, and so forth. Regardless of the form of identification, the correlation between the identifier sent separately from the certificate and the identifier encoded in the certificate indicates that the certificate was properly assigned to the device.

Login proxy 312 also receives credentials from the device in operation 304. Although not depicted in FIG. 3, the credentials may be supplied by processing a login page served by the login proxy to the device. The credentials might also be supplied contemporaneously with the certificate. Upon receipt of the credentials, login proxy 312 verifies their correctness, for example by correlating the supplied user name and password as recorded in a credentials repository 316.

The user and device combination may be further authorized by reference to a user, device and certificate white list 318. For illustrative purposes, white list 318 is depicted as a distinct entity in FIG. 3, but it may take any number of forms or be combined with other databases, services, data structures and so on. A purpose of the white list 318 is to authorize or deauthorize specific combinations of user, devices, and certificates. The authorization or deathorization may occur at various times, such as when the certificate is first downloaded to the device, or when an administrator desires to revoke access.

After login proxy 312 has performed desired validation and authorization, it may return an encrypted cookie to the device 300, which is received and stored on the device at operation 306.

Figure 5:
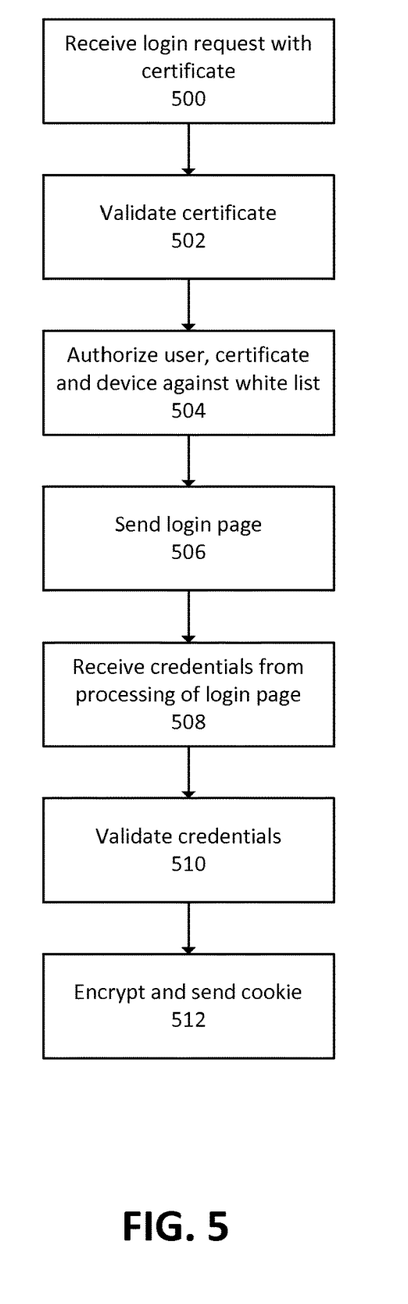
FIG. 5 depicts an embodiment of a login process in which a proxy returns a login page for processing by the device.

FIG. 5 depicts an embodiment of the login process in which the proxy returns a login page to be processed by the client. Although depicted as a sequence of operations, those of ordinary skill in the art will appreciate that operations depicted in FIG. 5 may be performed contemporaneously or in a different order, and operations may be added, omitted, or altered.

At operation 500, a login request is received from the client, accompanied by a certificate. The certificate is validated at 502 and the request is authorized at 504, using means consistent with the present specification. If the certificate is invalid or if the combination of user, device, and certificate is not authorized, a response may optionally be returned to indicate that proper authentication is required.

If the certificate is valid and the combination of user, device, and certificate is authorized to login, a login page may be sent to the device at operation 506. The device processes the login page and sends a set of credentials back to the proxy. At 508, the proxy receives the credentials, and then validates them at 510.

After both the certificate and credentials have been validated, the proxy may send an encrypted cookie to the device at 512. The device may use the cookie in conjunction with subsequent requests for access to information technology resources, such as those described elsewhere in this disclosure.

To obtain access to an information technology resource on the secure network, the device may include the encrypted cookie in subsequent requests sent to the proxy, to allow the proxy to validate the request. Furthermore, because the user and device's access to information technology resources on the secure network is limited to a finite set of operations, the request should also include information describing the request. The request is analogous to an interface call, including a name or other indication of the operation to be performed. One or more parameters may also be supplied if the specified interface call requires them. In addition, there may be various return values associated with the interface call, such as an indication of the operation's success or failure, or other types of data including but not limited to datasets or files.

The proxy may validate the cookie through a variety of means. Use of decryption and other cryptographic techniques may be used to ensure that the cookie's encrypted payload is genuine and unaltered. Various embodiments may also examine the contents of the encrypted payload and verify the relationship between information stored in the payload, other information sent in the request, and information stored on the secure network. For example, a record of issued certificates could be checked against the value of the certificate serial number contained in the certificate. Other embodiments might validate the electronic serial number of the requesting device with the device serial number encoded within the certificate.

In various embodiments, the user name is embedded within the encrypted portion of the cookie. The user name may be employed to implement various security measures. The user name may, for example, be compared to records of certificates and devices issued to or authorized for the user. The recorded values may further be compared to one or more of the values contained in the encrypted cookie or other data sent with the request.

The user name may also be used to restrict the available set of interface calls that will be allowed by the proxy. A given user may, for example, be granted permission to read data but not to write to it. In various embodiments, a list or table of allowed interface calls will be kept in a database or other resource accessible through the secure network, and used by the proxy to validate an incoming request. The allowability of a given interface call may be checked by comparing the name of the interface call provided in the request with an entry in the list or table. Various other elements may be used in addition to or instead of the user name. For example, the user name may be combined with the device identifier to allow a given user access to certain operations only when connected to a specific device. In an embodiment, location information from the device, such as GPS or wireless location data, is used to further restrict allowable interface calls. For example, a user may be allowed to access shipping and requisition information on the secure network only while physically located in the mailroom and using an authorized device.

In some embodiments, the proxy may route all interface calls to a single destination, which in various non-limiting examples may be a web service, database, directory server, and so forth. Other embodiments may allow the interface call to be directed to more than one target. In such cases the desired target may, in various non-limiting examples, be specified in the request, inferred from the interface call, or determined based on associations with the user or device.

The proxy may perform the desired operation on the target by marshaling any supplied parameters and invoking the desired interface call on the target. The precise nature of the invocation will vary according to its type. For example, a web service employing representational state transfer ("REST") might encode provided parameters into a uniform resource locater ("URL"). In some embodiments, certain supplied parameters might be omitted or altered based on the user name, device, or other factors. The proxy might also refuse to forward the request based on the values of certain parameters.

After the target completes the desired operation, the proxy receives or otherwise obtains data resulting from the operation, which may include indicators regarding the success or failure of the operation. The data may also include the results of the operation, such as the results of a database query. The data returned by the target may then be forwarded to the client in the same form as returned by the client, or translated to an alternate format.

Figure 4:
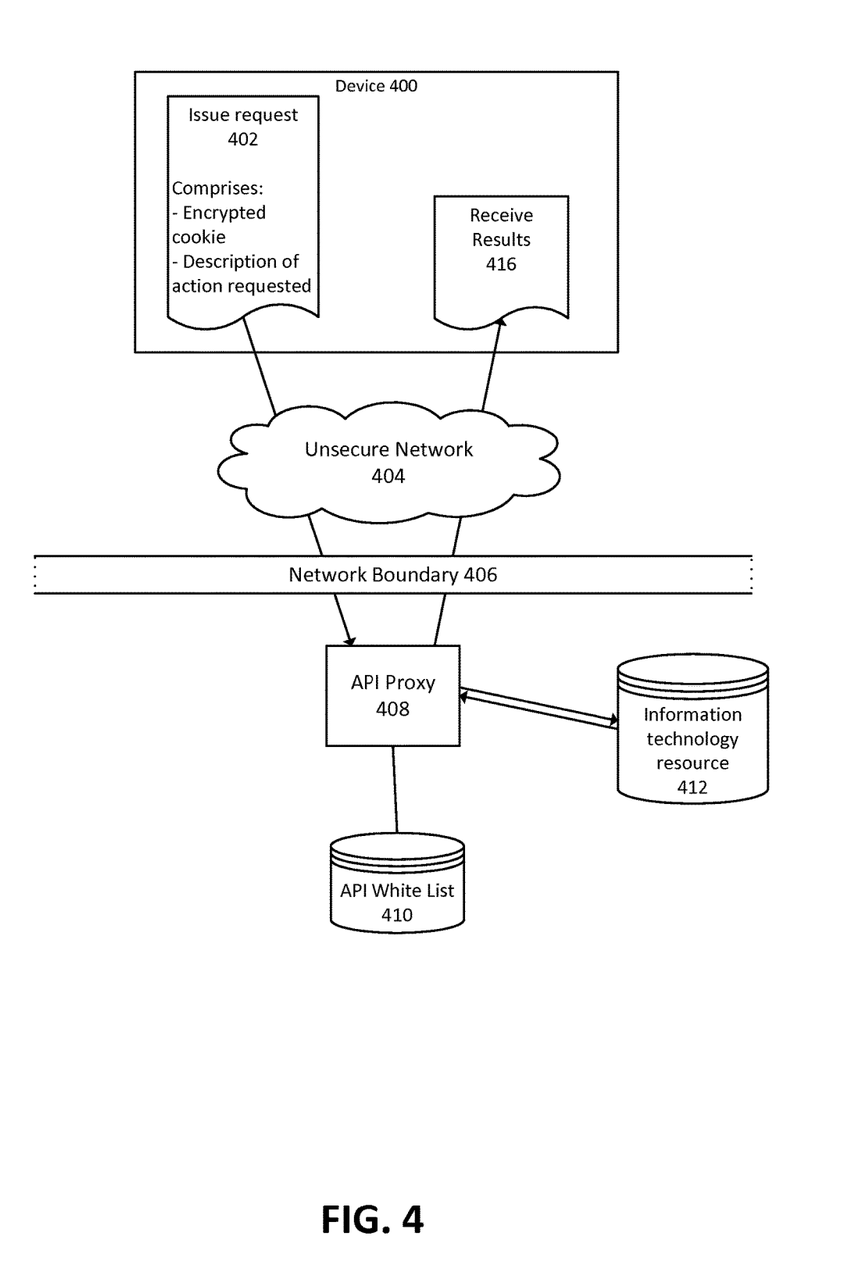
FIG. 4 depicts an embodiment of a system for obtaining access to information technology resources on a secure network.

FIG. 4 depicts an embodiment for obtaining access to information technology resources on a secure network. At operation 402, device 400 issues a request comprising the stored encrypted cookie and a description of the type of action requested. The request is transmitted over unsecure network 404, which may for example comprise a cellular telephone network and the Internet.

The API proxy 408 is situated behind or straddling network boundary 406, and is capable of continuous or intermittent communication with device 400 over unsecure network 404. Although depicted as a distinct entity, API proxy 408 may take any number of forms, and may for example be combined with other processes, systems, or modules. In particular, API proxy 408 may be combined with login proxy 312 from FIG. 3.

The API proxy 408 may validate the request by employing information obtained from the encrypted cookie sent as part of the request issued in operation 402. The cookie's encrypted payload may comprise a device identifier, user name, and a certificate identifier. The API Proxy may employ various means to decrypt the payload and access the values to be used. In various embodiments, the cookie payload is symmetrically encrypted by the login proxy 312 using a key that is accessible to the API proxy 408. The decryption process itself serves to indicate that the provided payload is valid and unaltered.

The certificate may also be included in the request. In some embodiments, the certificate can be utilized as an SSL client certificate in an SSL channel used to communicate with the proxy. In other embodiments, the certificate may be sent as a separate component of the request. If the certificate is included, it may be compared with a certificate serial number or other certificate identifier contained in the encrypted cookie to ensure that the certificate is properly matched to the cookie.

Further validation may be done by employing the values contained within the encrypted portion of the cookie. In some embodiments, a device identifier may be sent in the request, separate from the encrypted cookie. The proxy may verify the correlation between the device identifier sent in the request and the device identifier obtained from the cookie. Equal values may indicate that the certificate is being used from an authorized device, while unequal values may indicate the certificate is being used illicitly.

The API proxy 408 may access an API white list 410 to authorize the request issued in operation 402. A description of the action requested, contained in the request, may be cross referenced with entries in API white list 410. If the desired type of access is specified in the white list, the request is authorized. API proxy 408 may also factor additional information into the authorization, such as the user name or device identifier obtained from the cookie's encrypted payload.

The API proxy may also verify, for example at operation 410, that the specific resource implicated by the desired type of access is in a list of authorized resources. This list may be applicable to every user. It may also, for example, comprise a list of identifiers of information technology resources. The information technology resource identified or implicated in the request may be compared against this list of resources to determine if the request may be authorized.

If the API proxy 408 authorizes the request, it causes the desired action to be performed by or on information technology resource 412. In some embodiments, the API proxy 408 may interact with the information technology resource 412 to perform the desired action. In other embodiments API proxy 408 may act to forward the request to the resource.

Various means may be employed to return the results of the request to device 400. In FIG. 4, API proxy 408 interacts with information technology resource 412 to retrieve the results and forward them to the client.

Figure 6:
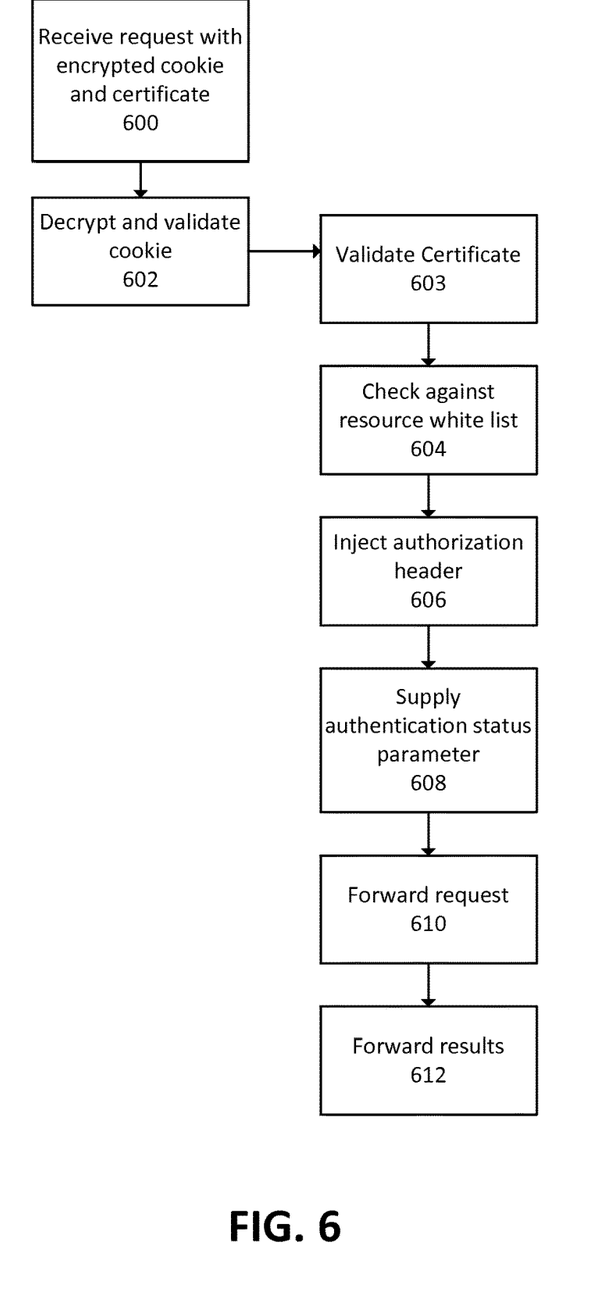
FIG. 6 depicts an embodiment of a process for forwarding requests from a proxy to an information technology resource on a secure network.

FIG. 6 depicts an embodiment for forwarding requests to an information technology resource on the secure network. At operation 600 the proxy receives a request accompanied by an encrypted cookie, which is then decrypted and validated at 602. The request may also include a certificate for additional validation, for example as depicted in operation 603. In an embodiment, the certificate may be validated by comparing a certificate identifier against a certificate identifier contained in the cookie's encrypted payload. At 604, the request for access to an information technology resource is checked against a white list.

The request received at 600 may be an HTTP web request. If the information technology resource is also accessible via web request, there is no need for the proxy to extensively modify the request. Instead, the proxy may forward the request with relatively minimal changes. For example, at operation 606 an authorization header is injected into the request to indicate that the proxy has validated and authorized the request. At operation 608, the proxy supplies a parameter to an HTTP web request indicating the status of the authentication. Operations 606 and 608 may be performed alone or in combination. The web request may then be forwarded to the information technology resource for processing 610, without significant additional processing by the proxy.

In various embodiments, traffic associated with a client request may be associated with a virtual internet protocol address while transiting the secure network. In this manner, the forwarded request appears to have originated from the virtual internet protocol address, and likewise any data comprising the request's results are addressed to the virtual internet protocol address. At 612, the proxy may act to intercept traffic on the secure network that is addressed to the virtual internet protocol address, forwarding it to the device over the unsecure network using the device's true address.

Those of ordinary skill in the art will appreciate that the order of operations given in FIG. 6 is merely illustrative. The various operations may be performed in varying order, altered or omitted. Furthermore, some may operate on a continuous basis, such as the result forwarding depicted at 612.

The embodiments described herein may find numerous application to data center construction projects, and to similar scenarios in which access to information technology resources is needed but not practical using conventional means. The embodiments for a mobile work platform are also likely to find numerous applications in these types of scenarios. Example applications of embodiments include ordering equipment, tracking shipments, access to software installation programs, and project management, performed by a mobile worker at a data center construction site.

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that various items are illustrated as being stored in memory or on storage while being used, and that these items or portions of thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system for allowing a user to access, through one or more unsecure networks, information technology resources accessible through a secure network, the system comprising:
   a memory having stored thereon instructions that, when executed by a computing device, cause the system to at least:
   download a certificate from the secure network to a mobile device, while the device is disconnected from the unsecure network;
   receive a request to begin a login process from the mobile device originating the request, the request comprising the certificate issued to the mobile device and a second device identifier that is separate from the certificate and corresponds to the mobile device, the certificate comprising a first device identifier that is inalterable by the user and associates the certificate with the mobile device;
   send the mobile device a login page to receive user credentials from the user in response to validating the certificate by comparing the first device identifier of the certificate to the second device identifier;
   validate user credentials received by the processing of the login page on the mobile device, and send a cookie to the mobile device, the cookie comprising an encrypted payload containing an identifier of the certificate;
   receive a second request, the second request for access to an information technology resource, the information technology resource accessible through the secure network, the request for access comprising the cookie and an indication of an interface call directed to the information technology resource;
   validate the second request by decrypting the encrypted payload, wherein the decrypting comprises a first stage of the validation, and checking the indication of an interface call against a list of interface calls authorized for use by the user; and forward the interface call to the information technology resource and to return results for the interface call to the device.

2. A method for accessing, by one or more unsecure networks at a data center construction site, information technology resources on a secure network, the method comprising:

downloading a certificate to a mobile device only when the mobile device is connected to the secure network, receiving a request, via the one or more unsecure networks, from the mobile device to initiate a login process, the request comprising the certificate and a device identifier corresponding to the mobile device that is separate from the certificate, the certificate issued to the mobile device and comprising encoded information identifying the mobile device that is inalterable by a user;

in response to the request to initiate a login process, validating the certificate by comparing the encoded information identifying the mobile device to the device identifier, validating credentials sent by the mobile device, and sending a cookie to the device, the cookie comprising an encrypted payload containing an identifier of the certificate;

receiving from the mobile device a request for access to an information technology resource, the information technology resource connected to a trusted network, the request for access comprising the cookie and a description of an interface call; and validating the request for access by decrypting the encrypted payload, comparing the identifier of the certificate from the encrypted payload to a second identifier of the certificate, and verifying that a user corresponding to the credentials is authorized to access the information technology resource.

3. A method for remote access, via an unsecured network, to a secure network, the method comprising:

creating a certificate comprising an identifier of a mobile device and storing an association between a user of the mobile device and the certificate;

sending the certificate to the mobile device while the mobile device is directly connected to the secure network and disconnected from the unsecured network, the certificate issued to the mobile device and inalterable by the user upon creation;

receiving a login request comprising the certificate and credentials corresponding to the user, wherein the login request was sent from the device to a proxy over the unsecured network;

validating the request by verifying the validity of the certificate, verifying the credentials corresponding to the user, and verifying the association between the user and the certificate;

sending a cookie to the device over the unsecured network, the cookie comprising an encrypted payload;

receiving a request to access an information technology resource on the secured network, the request comprising the cookie and a description of an interface call; and validating the request to access an information technology resource by decrypting the encrypted payload and comparing the identifier of the certificate from the encrypted payload to a second identifier of the certificate.

4. The method of claim 3, comprising further validating the request to access an information technology resource by associating a certificate identifier, device identifier, or user login name contained in the encrypted payload with corresponding information received by the proxy from a source on the secure network.

5. The method of claim 3, comprising disconnecting the mobile device from the secure network and transporting the device to a work location.

6. The method of claim 3, comprising receiving, by the proxy, equipment tracking information from the device, the equipment tracking information indicative of equipment installed at a work location.

* * * * *